United States Patent [19]
Schneider et al.

[11] Patent Number: 6,023,503
[45] Date of Patent: *Feb. 8, 2000

[54] METHOD FOR DECIDING ON THE ACCEPTANCE OR NON-ACCEPTANCE OF A CALL, AS WELL AS CIRCUIT MODULE, COMMUNICATION TERMINAL, PORTABLE UNIT, AND NETWORK COMPONENT FOR A TELECOMMUNICATION NETWORK

[75] Inventors: Jan Schneider, Waiblingen; Günther Herzog, Stuttgart; Anke Schmietainski, Hemmingen, all of Germany

[73] Assignee: Alcatel Alsthom Compagnie Generale d'Electricite, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/771,208

[22] Filed: Dec. 20, 1996

[30] Foreign Application Priority Data

Dec. 22, 1995 [DE] Germany .......................... 195 48 190

[51] Int. Cl.⁷ .............................. H04M 3/00; H04M 3/42
[52] U.S. Cl. .......................... 379/188; 379/201; 379/210; 379/211
[58] Field of Search .................................. 379/188, 199, 379/201, 207, 210, 211, 212

[56] References Cited

U.S. PATENT DOCUMENTS

| | | |
|---|---|---|
| 5,329,578 | 7/1994 | Brennan et al. .......................... 379/67 |
| 5,487,111 | 1/1996 | Slusky ...................................... 379/211 |
| 5,548,636 | 8/1996 | Bannister et al. ...................... 379/211 |
| 5,550,907 | 8/1996 | Carlsen .................................. 379/211 |
| 5,553,128 | 9/1996 | Grimes .................................. 379/211 |
| 5,668,862 | 9/1997 | Bannister et al. ...................... 379/211 |
| 5,724,417 | 3/1998 | Bartholomew et al. ................. 379/211 |
| 5,742,674 | 4/1998 | Jain et al. ............................... 379/209 |
| 5,905,789 | 5/1999 | Will ....................................... 379/211 |

FOREIGN PATENT DOCUMENTS

| | | |
|---|---|---|
| 0502617 | 9/1992 | European Pat. Off. . |
| 3036380 | 5/1982 | Germany . |
| 3411206 | 10/1985 | Germany . |
| 3133531 | 6/1989 | Germany . |
| 4116469 | 11/1992 | Germany . |

*Primary Examiner*—Krista Zele
*Assistant Examiner*—Benny Q. Tieu
*Attorney, Agent, or Firm*—Ware, Fressola, Van Der Sluys & Adolphson LLP

[57] ABSTRACT

The invention relates to a method for deciding on the acceptance or non-acceptance of a call by taking into consideration data signaled in conjunction with the attempt to establish a connection to a certain subscriber who is the called party, wherein in addition to the signaled data other data are considered which identify the actual situation of the certain subscriber and wherein the data are combined according to freely predetermined criteria, as well as a circuit module, a communication terminal, a portable unit, and a network component for a telecommunication network.

7 Claims, 2 Drawing Sheets

METHOD FOR DECIDING ON THE ACCEPTANCE OR NON-ACCEPTANCE OF A CALL, AS WELL AS CIRCUIT MODULE, COMMUNICATION TERMINAL, PORTABLE UNIT, AND NETWORK COMPONENT FOR A TELECOMMUNICATION NETWORK

BACKGROUND OF THE INVENTION

1. Field of the Invention

The invention relates to a method for deciding on the acceptance or non-acceptance of a call, to a circuit module, to a communication terminal, to a portable unit, in particular a chip card, and to a network component for a telecommunication network.

2. Description of the Related Art

The opportunities for being able to reach a certain subscriber at almost any time and at almost any location are increasing rapidly. Contributing hereto is primarily a denser telephone network with sometimes several terminals connected in parallel and being capable of accepting a call with equal access privilege, for example inside a single-family home or in an office, warehouse or shop. Included herein are also the different types of call rerouting, including call forwarding. Furthermore, the non-wire-line terminals, like cordless phones, mobile radio, mobile phones and communication via satellite, increase accessibility. An added feature is provided by the use of uniform subscriber numbers, obviating the need to distinguish between the terminal in the office, in the car and at home. The certain substitute can also initiate a call home or to a central office from a foreign terminal and to treat this terminal, by appropriate signaling, temporarily as the certain subscriber's own terminal. For such calls and signaling, there are provided, for example, chip cards or telephone cards which, on one hand, allow rerouting of incoming calls to this terminal and, on the other hand, charge the tolls for outgoing calls to the certain subscriber own account. Although specially designed terminals are presently required for this purpose, this can also be accomplished by acoustic or inductive coupling.

Consequently, an appropriate defense against misuse is required.

The easiest defense is muting or ignoring the telephone terminal. By providing a telephone number filter, only certain callers would be connected and announced by a different ringing.

It is rather common to connect a telephone answering machine in parallel, for the certain subscriber to listen in when the caller speaks, and to decide only then if the certain subscriber prefers to accept the call or not. Aside from the fact that this is rather annoying provided the certain subscriber hears the call at all, this method is not adapted to, for example, rouse a sleeping tenant in a burning house.

To this end, a ranking of calls or callers according to urgency could help. According to the solution described in U.S. Pat. No. 5,329,578, a high priority could, for example, be assigned to the police and the fire departments. Aside from the fact that these departments would then have to use the known emergency numbers also for outgoing calls, the rerouting of calls in this and other situations will here not make sense.

One may approve that the boss may be entitled to cut into every official meeting with his call, and that the grandmother may be entitled to interrupt a Christmas party in a remote mountain hut with her call. Conversely, this does not have to occur, as is provided in the U.S. Pat. No. 5,329,578 referenced above. And it is also doubtful if these two parties would like this to happen. This is particularly true in view of the higher cost associated with rerouting a call in public networks.

SUMMARY OF THE INVENTION

According to a first aspect of the invention, a method for deciding on the acceptance or nonacceptance of a call with the aid of data which are signaled in connection with an attempt to establish a call to a certain subscriber, is characterized in that in addition to the signaled data, recourse is had to data which characterize a current situation of the certain subscriber, the data being combined according to freely predetermined criteria.

According to a second aspect of the invention, a circuit module (M) for deciding on acceptance or nonacceptance of a call, comprising receiving means for receiving data which are signaled in connection with an attempt to establish a call to a certain subscriber, and evaluating means which decide on the acceptance or nonacceptance of the call with the aid of the received data, is characterized in that collection means are provided for collecting data which characterize the current situation of the certain subscriber, and that the evaluating means take said data into account, said data being combined according to a freely predetermined criteria.

According to a third aspect of the invention, a communication terminal (B1), is characterized in that it includes a circuit module (M) for deciding on acceptance or nonacceptance of a call, comprising receiving means for receiving data which are signaled in connection with an attempt to establish a call to a certain subscriber, and evaluating means which decide on the acceptance or nonacceptance of the call with the aid of the received data, and is further characterized in that collection means are provided for collecting data which characterize the current situation of the certain subscriber, and that the evaluating means take said data into account, said data being combined according to a freely predetermined criteria.

According to a fourth aspect of the invention, a portable unit (B3), particularly a chip card, capable of being coupled to a suitable communication terminal (B4), said portable unit (B3) comprising means for entering, via a communication terminal coupled thereto, the identity of a certain subscriber who is the owner of the unit as a temporary user of the communication terminal, particularly for making him or her reachable via said communication terminal at a previously assigned subscriber number, is characterized in that the unit (B3) comprises a circuit module (M) for deciding on acceptance or nonacceptance of a call, comprising receiving means for receiving data which are signaled in connection with an attempt to establish a call to the certain subscriber, and evaluating means which decide on the acceptance or nonacceptance of the call with the aid of the received data, and is further characterized in that collection means are provided for collecting data which characterize the current situation of the certain subscriber, and that the evaluating means take said data into account, said data being combined according to a freely predetermined criteria.

According to a fifth aspect of the invention, a network component (B2, S) for a telecommunication network (N), comprising means for receiving data which are signaled in connection with an attempt to establish a call to a certain subscriber, and means serving to further treat this call attempt, is characterized in that the network component comprises a circuit module (M) for deciding on acceptance or nonacceptance of a call, comprising receiving means for receiving data which are signaled in connection with an attempt to establish a call to the certain subscriber, and evaluating means which decide on the acceptance or nonacceptance of the call with the aid of the received data, and is further characterized in that collection means are provided for collecting data which characterize the current situation of the certain subscriber, and that the evaluating means take said data into account, said data being combined according to a freely predetermined criteria.

The underlying concept in this case is that generally a decision according to freely predetermined criteria is made automatically, wherein data signaled from the caller side are used as well as data characterizing the actual situation of a certain subscriber, i.e., the called party.

The identity of the caller can almost always be inferred from and is indicated by the signaling received from the caller side (e.g. from the telephone number) if the caller is known to the certain subscriber who is called party, if any data are signaled at all, which is presumed in this case. It can also be inferred directly from the telephone number if the call is a local call or a long-distance call. It does not appear objectively correct to deduce a priority attribute from the telephone number of the caller; a specific meaningful attribute may, however, be inferred from a known number or from an agreed-upon code dialed after the telephone number. It may also make sense to indicate for the purpose of evaluation if this call is a direct call or an already rerouted call.

The foremost part of the data characterizing the actual situation is generally the time. Working hours, leisure time and the weekend are clearly defined blocks of time which do not significantly fluctuate from day to day and each of which limits the group of primarily desirable callers in different ways. Where the certain subscriber can be reached via mobile radio, via alternate terminals, for example in the home, in the office and in the warehouse, or when the call is rerouted to a remote terminal in the weekend house, in the club house or to a customer, the certain subscriber's location which is often clearly indicative of the actual situation, is determined directly or indirectly. The actual situation may also be specified by manual inputs.

The evaluation may take place in the called terminal, in a server or with the help of a chip card insertable into any device adapted therefor.

These and other objects, features and advantages of the present invention will become more apparent in light of the detailed description of a best mode embodiment thereof, as illustrated in the accompanying drawing.

DESCRIPTION OF THE PREFERRED EMBODIMENT

Figure 1:
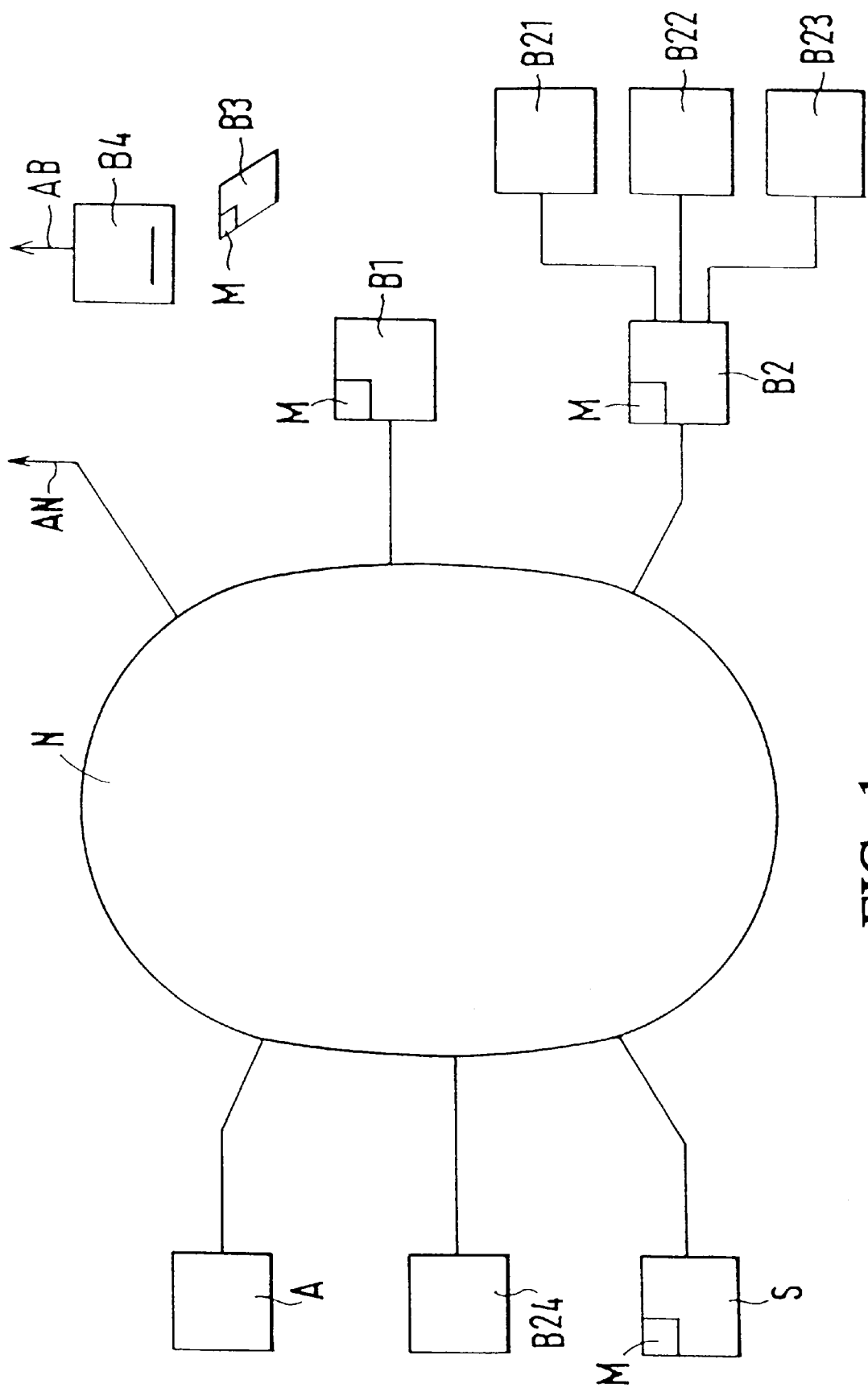
FIG. 1 shows a system for carrying out the method of the invention, together with circuit modules according to the invention, a communication terminal according to the invention, a portable unit according to the invention, and network component according to the invention.

The system of FIG. 1 shows a telecommunication network N, a plurality of wire-line communication terminals A, B1, B21, B22, B23 and B24, a small private branch exchange B2, a communication terminal B4 reachable via mobile radio, a chip card B3 and a service provider unit S called a server. The communication terminal B1, the private branch exchange B2, the server S and the chip card B3 each include a module M. The communication terminal B4 includes a chip card reader and is connected to the telecommunication network N via an antenna AB on the user side or an antenna AN on the network side.

The modules M are examples for the circuit modules of the invention. The communication terminal B1 is an example for a communication terminal designed according to the invention. The chip card B3 is an example for a portable unit according to the invention. The private branch exchange B2 is an example for a network component according to the invention. The server S is an example for a network component according to the invention which is common to a plurality of users.

The communication terminal A herein is representative for a plurality of arbitrary terminals not necessarily designed according to the invention. Primarily, voice terminals are considered, but other types of terminals may not entirely be excluded.

The small private branch exchange B2 and the communication terminals B21, B22 and B23 form a building installation where one of the terminals may be installed in the living quarters, another terminal in the office and a third one in the hobby room. The communication terminal B24 in the weekend house can be reached via the telecommunication network N in the same way as a terminal of the private branch exchange. Calls originating from the network N can be rerouted thereto. It is hereby immaterial if rerouting takes place through forwarding via another channel or through intervention into the routing itself. For the sake of simplicity it will be assumed that the private branch exchange B2 can be reached from the network N under two different telephone numbers, one of these numbers associated with the personal name and the other number associated with the name of the business. Each connected terminal, however, can be reached under both numbers. The module M in the private branch exchange B2 arranges for the distribution. The communication terminal B24, too, has its own number.

If a caller uses the communication terminal A for calling a certain subscriber who is the owner of the private branch exchange B2, different situations may arise which are described hereinafter with reference to examples:

The certain subscriber who is the owner of the PBX B2 is in his office during regular office hours and has communicated this, for example by using the terminal installed at that location, to the module M in the private branch exchange B2. If the caller calls the number assigned to the company name, the company number, the caller will be connected. If he calls the number assigned to the personal name, the private number, then a second criteria must be added in order for the call to be connected:

Calls which can somehow be marked as urgent, are connected.

The module M includes a telephone number filter allowing certain calling persons to be connected even when they call the private number.

The module M is capable of recognizing a code dialed subsequent to the telephone number and agreed-upon for this purpose.

Figure 2:
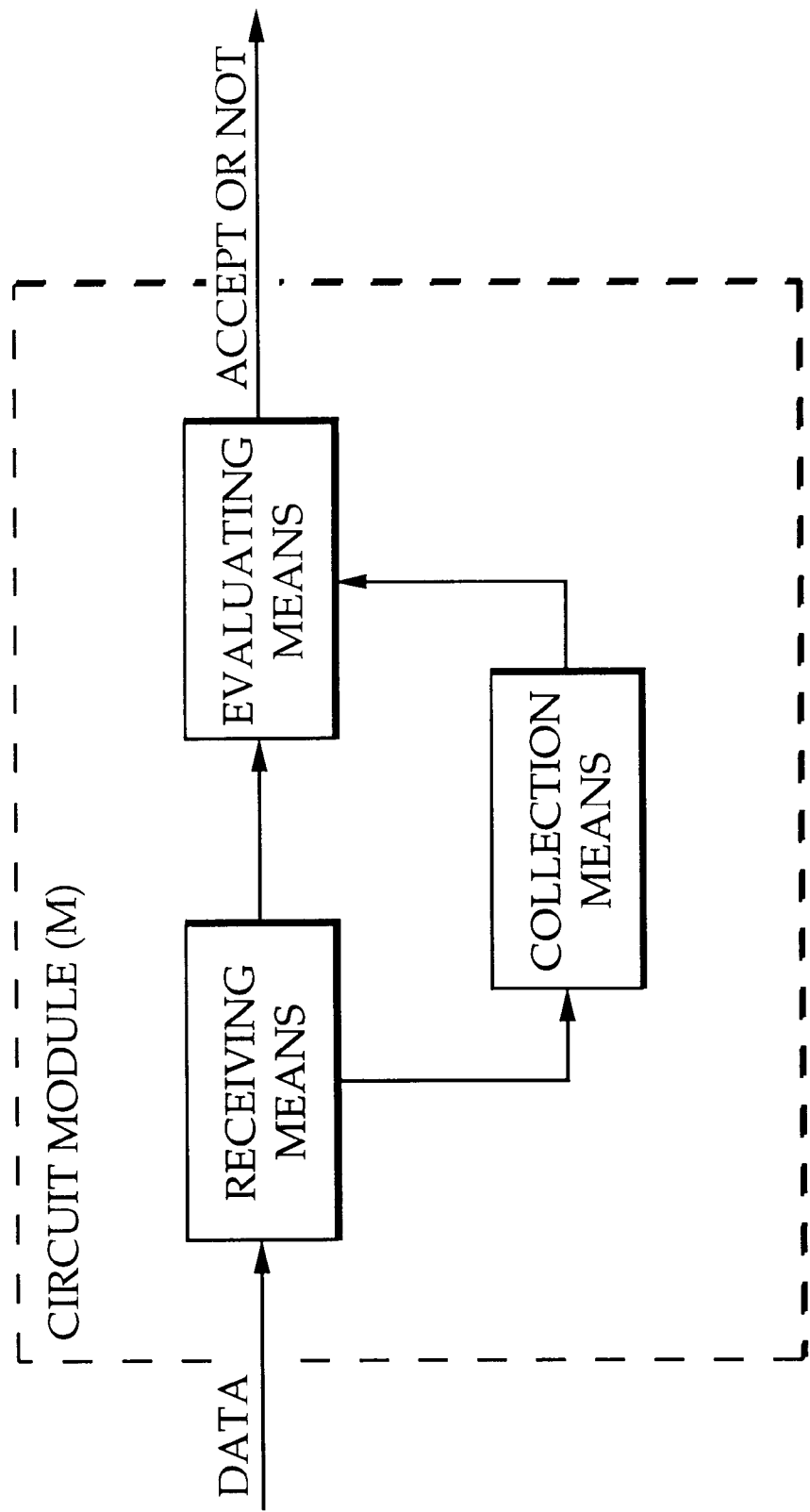
FIG. 2 shows a circuit module (M).

As shown in FIG. 2, the circuit module for deciding on acceptance or nonacceptance of a call may comprise receiving means for receiving data which are signaled in connection with an attempt to establish a call to a certain subscriber and evaluating means which decide on the acceptance or nonacceptance of the call with the aid of the received data. According to the invention, collection means are provided for collecting data which characterize the current situation of the certain subscriber. The evaluating means take the received data into account, the data being combined either in the collection means or the evaluating means according to freely predetermined criteria such as mentioned above.

The certain subscriber who is the owner of the PBX B2 is in his office outside regular office hours. Calls to the company number and to the private number are now treated equally. In both cases, however, a third criteria must be added for the call to be connected.

The certain subscriber who is the owner of the PBX B2 is at home in the evening. All calls to the private number are now connected, calls to the office are restricted as discussed above.

The certain subscriber who is the owner of the PBX B2 is in his hobby room. Call to the private number are connected if they are marked as urgent or if a telephone number filter recognizes them are originating from hobbyists. Call to the company number are connected if they are marked as urgent.

The certain subscriber who is the owner of the PBX B2 is in his weekend house B24. Due to the cost alone, calls are rerouted only under exceptional circumstances. Either a special urgency or a special code will have to be signaled.

For special events, for example over Christmas, calls are connected only via telephone number filters or due to extraordinary urgency.

The preset parameters can be changed manually, either temporarily or permanently. This may be accomplished according to established procedures from one of the terminals via the touch keys or possibly with acknowledgment from module M via voice output or display. For example, the terminal at home shall temporarily be reachable under conditions which otherwise apply to the terminal in the office.

So far, nothing has been mentioned about what happens with those calls that are not to be accepted and how an identification based on urgency can be accomplished and which levels of urgency and importance would have to be provided. But this is not the primary object of this invention. For this purpose, every solution which is already known or which will be known in the future can be employed.

For calls which will not be accepted, the aforementioned U.S. Pat. No. 5,329,578 provides several possibilities, such as pre-defined answers or connecting to a telephone answering machine. The simplest solution is non-acceptance by suppressing the ringing. Furthermore, signaling to the network or to the caller may be considered whereupon the call is disconnected. A signal may be transmitted to the caller indicating under which conditions (code, urgency) he may be able to still complete his call successfully.

Urgency or importance attributes could be entered by the caller by subsequently dialing an individually agreed-upon code or in a manner prescribed by the network operator. In order to make misuse more difficult, a fee could be levied for this service which would be credited in part to the network operator for supplying this service and in part to the certain subscriber who is the called party. In principle, a certain subscriber who is owner of the communication terminal B1 can realize the same functions with this terminal B1, albeit with certain restrictions. The criteria in this case may become coarser or additional manually preset parameters may be required.

Each subscriber on a communication terminal A may utilize a server S of a service provider in order to be able to benefit from this functionality. A certain subscriber can then be reached under a telephone number, where a call or at least the signaling of a call first reaches a server S, thereby addressing a storage area in module M in which the specific settings of that certain subscriber are stored. The server S and the module M cooperate with the network N by signaling, so that said call is treated according to the settings for this certain subscriber.

It is known to use acoustic couplers, inductive coupling or even a chip card B3 to change an arbitrary terminal or, in the case of the chip card, a suitable terminal temporarily into a certain subscriber's personal terminal. For this purpose, the actual location of the certain subscriber and where he can be reached, are signaled to a programmed point in the network. The calls directed to the certain subscriber, for example of the chip card B3, are then directed to the respective terminal to which the certain subscriber has attached himself, for example by inserting his chip card B3 into the chip card reader of the communication terminal B4, such as a mobile phone. The module M which is included in the chip card B3 or in the other coupled unit, has the effect that calls are only accepted according to the respective preset parameters or indicated through ringing.

It is understood that the circuit modules specific to the invention, the modules M, do not have to be provided as separate modules, but could functionally be combined with other units.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method for deciding on the acceptance or nonacceptance of a call from a caller with the aid of caller data indicative of a caller identity which are signaled in connection with an attempt to establish said call to a certain subscriber, characterized in that in addition to the signaled caller data, actual situation data which is collected by the step of inferring an actual current situation of the certain subscriber from all possible combinations of actual current situations of the certain subscriber including time-dependent, location-dependent, and priority-dependent habits of the certain subscriber, is combined with said caller data according to freely predetermined criteria, so that said acceptance or nonacceptance is based on both said caller data and said actual situation data, including said time-dependent, location-dependent, and said priority-dependent habits of the certain subscriber, and all possible combinations thereof.

2. A method as claimed in claim 1, characterized in that manual inputs by the certain subscriber are taken into account.

3. A circuit module (M) for deciding on acceptance or nonacceptance of a call, comprising receiving means for receiving caller data indicative of a caller identity which are signaled in connection with an attempt to establish said call to a certain subscriber, and evaluating means which decide on the acceptance or nonacceptance of the call with the aid of the received caller data, characterized in that collection means are provided for collecting actual situation data which characterize an actual current situation of the certain subscriber from all possible combinations of actual current situations of the certain subscriber including time-dependent, location-dependent, and priority-dependent habits of the certain subscriber, that the evaluating means take said caller data and said actual situation data into account, said caller data and said actual situation data being combined according to freely predetermined criteria, and that said acceptance or nonacceptance is based on both said caller data and said actual situation data, including said time-dependent, location-dependent, and said priority-dependent habits of the certain subscriber, and said priority-dependent habits of the certain subscriber, and all possible combinations thereof.

4. A communication terminal (B1), characterized in that it includes a circuit module (M) for deciding on acceptance or nonacceptance of a call, comprising receiving means for receiving caller data indicative of a caller identity which are signaled in connection with an attempt to establish said call to a certain subscriber, and evaluating means which decide on acceptance or nonacceptance of the call with the aid of the received data, in that collection means are provided for collecting actual situation data which characterize an actual current situation of the certain subscriber from all possible combinations of actual current situations of the certain subscriber including time-dependent, location-dependent, and priority-dependent habits of the certain subscriber, and in that the evaluating means take said caller data and said actual situation data into account, said caller data and said actual situation data being combined according to freely predetermined criteria, and that said acceptance or nonacceptance is based on both said caller data and said actual situation data, including said time-dependent, location-dependent, and said priority-dependent habits of the certain subscriber, and all possible combinations thereof.

5. A portable unit (B3), particularly a chip card, capable of being coupled to a suitable communication terminal (B4), said portable unit (B3) comprising means for entering, via said suitable communication terminal coupled thereto, the identity of a certain subscriber who is the owner of the unit as a temporary user of the communication terminal, particularly for making the certain subscriber reachable via said communication terminal at a previously assigned subscriber number, characterized in that the unit (B3) comprises a circuit module (M) for deciding on acceptance or nonacceptance of a call, comprising receiving means for receiving caller data indicative of a caller identity which are signaled in connection with an attempt to establish a call to the certain subscriber, and evaluating means which decide on the acceptance or nonacceptance of the call with the aid of the received caller data, further characterized in that collection means are provided for collecting actual situation data which characterize an actual current situation of the certain subscriber from all possible combinations of actual current situations of the certain subscriber including time-dependent, location-dependent, and priority-dependent habits of the certain subscriber, that the evaluating means take said caller data and said actual situation data into account, said caller data and said actual situation data being combined according to freely predetermined criteria, and that said acceptance or nonacceptance is based on said caller data and said actual situation data, including said time-dependent, location-dependent, and said priority-dependent habits of the certain subscriber, and all possible combinations thereof.

6. A network component (B2, S) for a telecommunication network (N), comprising means for receiving caller data indicative of a caller identity which are signaled in connection with an attempt to establish a call to a certain subscriber, and means serving to further treat this call attempt, characterized in that the network component comprises a circuit module (M) for deciding on acceptance or nonacceptance of a call, comprising receiving means for receiving said caller data which are signaled in connection with an attempt to establish a call to the certain subscriber, and evaluating means which decide on the acceptance or nonacceptance of the call with the aid of the received caller data, that collection means are provided for collecting actual situation data which characterize the current actual situation of the certain subscriber from all possible combinations of current actual situations of the certain subscriber including time-dependent, location-dependent, and priority-dependent habits of the certain subscriber, that the evaluating means take said caller data and said actual situation data into account, said caller data and said actual situation data being combined according to freely predetermined criteria, and that said acceptance or nonacceptance is based on said caller data and said actual situation data, including said time-dependent, location-dependent, and said priority-dependent habits of the certain subscriber, and all possible combinations thereof.

7. A network component (S) as claimed in claim 6, characterized in that it is designed to be capable of performing the same functions for a plurality of subscribers.

* * * * *

UNITED STATES PATENT AND TRADEMARK OFFICE
CERTIFICATE OF CORRECTION

PATENT NO.    : 6,023,503
DATED         : February 8, 2000
INVENTOR(S)   : Jan Schneider et al.

Page 1 of 1

It is certified that error appears in the above-identified patent and that said Letters Patent is hereby corrected as shown below:

<u>Column 7,</u>
Lines 4-5, please cancel "and said priority-dependent habits of the certain subscriber".

Signed and Sealed this

Fifth Day of February, 2002

Attest:

JAMES E. ROGAN
Attesting Officer    Director of the United States Patent and Trademark Office